July 29, 1969     R. C. CLEMENSON     3,458,085
VALVE FOR FUEL STORAGE TANKS
Filed Nov. 30, 1967
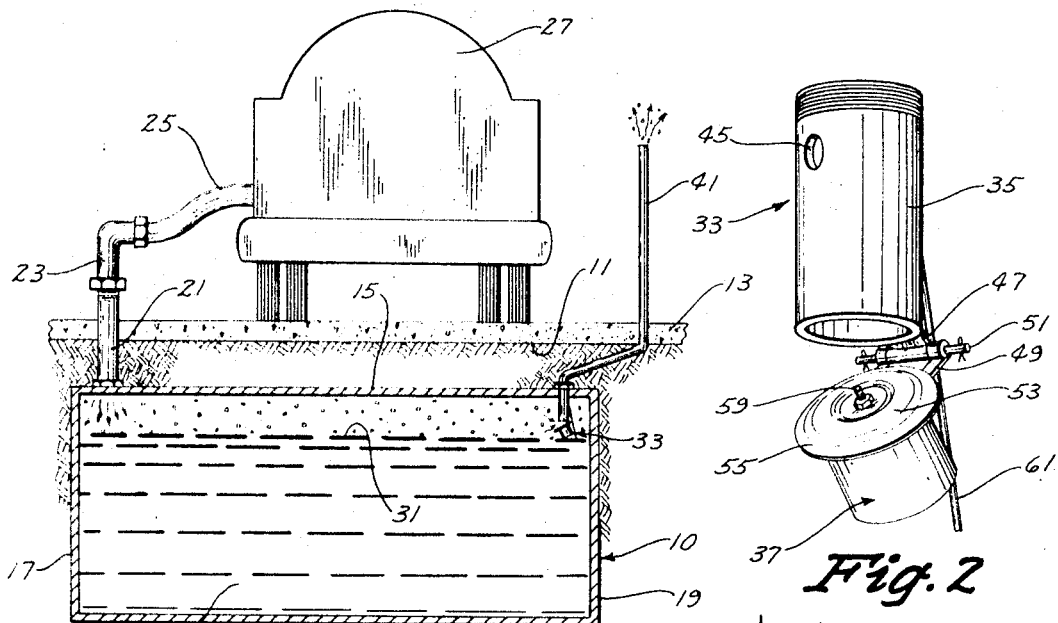
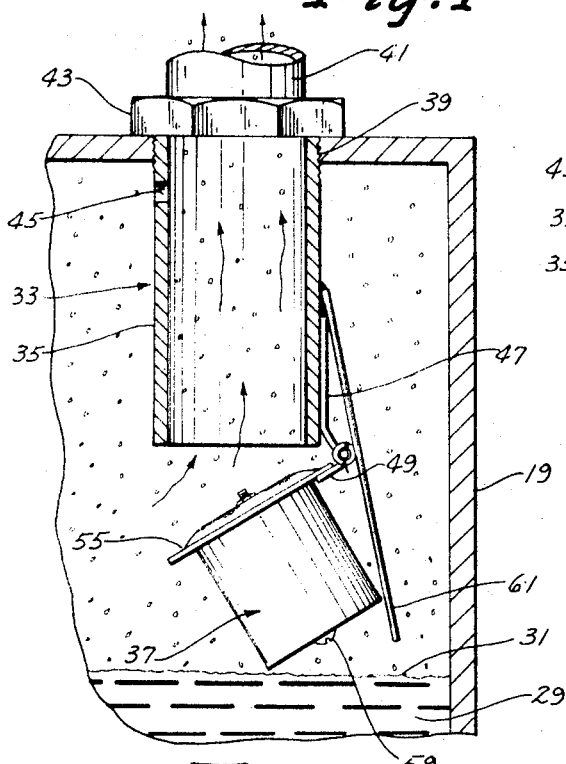
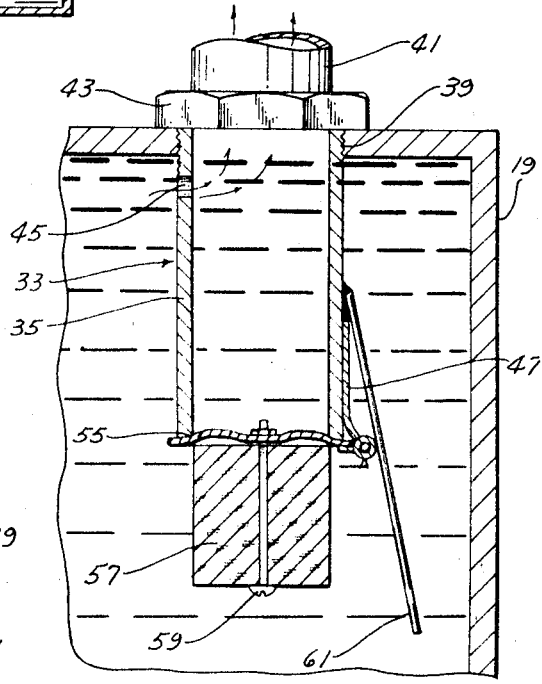
INVENTOR
RAYMOND C. CLEMENSON
BY
ATTORNEYS

United States Patent Office 3,458,085
Patented July 29, 1969

3,458,085
VALVE FOR FUEL STORAGE TANKS
Raymond C. Clemenson, 447 N. Shadyview Blvd.,
Des Moines, Iowa 50317
Filed Nov. 30, 1967, Ser. No. 687,036
Int. Cl. B65d *87/10;* B65b *3/18;* F16t *1/22*
U.S. Cl. 220—86                                         6 Claims

ABSTRACT OF THE DISCLOSURE

A valve for fuel storage tanks designed to prevent the overflow of liquid from the vent pipe which extends upwardly from the upper end of the fuel tank. The tank vent pipe is connected to a hollow cylinder which extends downwardly into the upper end of the tank. A floatable valve member is hingedly secured to the lower end of the cylinder and is designed to seal the lower end of the cylinder when the fuel reaches a level sufficient to hingedly float the same into engagement with the cylinder.

---

Fuel storage tanks are usually buried in the ground and have a fill pipe and a vent pipe extending upwardly therefrom. The fill pipe is obviously used to fill the tank while the vent pipe is a safety device designed to permit the tank to "breathe." A tank truck operator who is filling the fuel storage tank can only determine the fuel level therein by extending a measuring stick or the like downwardly into the tank. This method is time consuming and usually requires that the tank truck operator halts the filling operation during the measurement. The usual result is that the tank truck operator, in an effort to conserve time, does not measure the fuel level in the storage tank during the filling operation but simply pumps the fuel into the storage tank until the tank truck is empty or until the fuel overflows from the vent pipe. A serious fire hazard exists when the fuel overflows from the vent pipe and is therefore obviously undesirable.

Therefore, it is a principal object of this invention to provide a valve for a fuel storage tank.

A further object of this invention is to provide a valve for a fuel storage tank which closes the lower end of the vent pipe when the fuel in the tank reaches a predetermined level.

A further object of this invention is to provide a valve for a fuel storage tank which is floatably hingedly secured to the lower end of a hollow cylinder which is secured to the lower end of the tank vent pipe.

A further object of this invention is to provide a valve for a fuel storage tank which causes a sufficient back pressure to indicate to the tank truck operator that the tank is substantially full.

A further object of this invention is to provide a valve for a fuel storage tank which permits the vent pipe to function in its desired manner.

A further object of this invention is to provide a valve for a fuel storage tank which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a fragmentary sectional view of the fuel storage tank illustrating the relationship thereof with the associated components;

FIG. 2 is a perspective view of the valve illustrating the valve in an open position;

FIG. 3 is a partial sectional view of the valve in an open position; and

FIG. 4 is a view similar to FIG. 3 except that the valve is illustrated in a closed position.

The numeral 10 generally designates a conventional fuel storage tank buried beneath the ground surface 11 which is shown to be covered with a paving material 13. Tank 10 is usually cylindrical in shape and includes an upper end 15 with opposite sides 17 and 19. A fill pipe 21 is secured to the upper end of tank 10 at one end thereof and extends upwardly therefrom as illustrated in FIG. 1. A coupling means 23 is secured to the upper end of pipe 21 and is adapted to detachably receive the discharge hose 25 to facilitate the filling of the tank 10 by the tank truck 27. Thus, the fuel is pumped from the truck 27 through the hose 25, coupling means 23 and pipe 21 to the interior of the tank 10. The fuel within the tank is designated by the reference numeral 29 with the fuel level being indicated by the reference numeral 31.

The valve means of this invention is designated by the reference numeral 33 and includes an elongated hollow cylinder 35 having a floatable valve 37 hingedly secured to the lower end thereof. The upper end of cylinder 35 is threadably secured to the tank 10 at opening 39 as illustrated in FIG. 4. A vent pipe 41 is threadably secured to the upper end of cylinder 35 by means of coupling 43 and extends upwardly therefrom as illustrated in FIG. 1. Obviously, cylinder 35 could be operatively connected to vent pipe 41 by any convenient means. Cylinder 35 is provided with a port 45 extending therethrough adjacent its upper end below upper end 15 and tank 10. A hinge member 47 is secured to the exterior of cylinder 35 adjacent the lower end thereof and has a hinge member 49 hingedly secured thereto by pin 51.

A circular disk 53 is secured to hinge member 49 by welding or the like and is adapted to close the lower end of cylinder 35 as illustrated in FIG. 4. Disk 53 has a diameter greater than the diameter of cylinder 35 and has a downwardly extending peripheral portion 55 which engages the lower end of cylinder 35 as illustrated in FIG. 4. A cylindrical float 57 constructed of cork or other suitable material is secured to the bottom of disk 53 by a bolt assembly 59 extending therethrough. As best seen in FIG. 3, a rod 61 is secured to the exterior surface of cylinder 35 and extends downwardly and outwardly therefrom. Rod 61 is positioned adjacent the hinge connection of hinge members 47 and 49 and is designed to limit the downward pivotal movement of the valve 37 as illustrated in FIG. 3. Thus, FIG. 3 illustrates the valve 37 in an open condition with respect to cylinder 35 inasmuch as the fuel level 31 is below the lowermost portion of float 57. FIG. 4 illustrates the valve 37 in a closed condition with respect to cylinder 35 inasmuch as the fuel level is above the valve 37 which has caused the float 57 to pivot the disk 53 into sealing engagement with the lower end of cylinder 35.

In operation, the tank truck operator will pump the fuel from the tank truck 27 into the interior of the tank 10 as previously described. The valve 37 will remain in an open position with respect to cylinder 35 until such time as the fuel level causes the same to pivot into sealing engagement with the lower end of cylinder 35. Prior to the sealing of the lower end of cylinder 35, the air within the tank will be vented outwardly through vent pipe 41 as the fuel is being pumped into the tank 10. When the fuel level reaches a sufficient height to float the valve 37 into sealing engagement with the lower end of cylinder 35, the air within the tank can only be forced outwardly through vent pipe 41 by means of port 45. Thus, as soon as valve 37 has closed, the passage of the air through the port 45 will cause a sufficient back pressure to occur against the pump action which will be readily detected by the tank truck operator. Thus, the presence of the back pressure will indicate to the tank truck operator that the tank is practically full thereby permitting him to deactivate the pump on the tank truck. Port 45 permits the tank to "breathe" even though valve 37 is closed. The valve 37 will open at such time as the fuel level 31 drops so that the float 37 will no longer maintain disk 53 in sealing engagement with the lower end of cylinder 35. The rod 61 limits the downward movement of the valve 37 to insure that the valve 37 will not be pivoted in a counterclockwise direction as viewed in FIG. 3 upon the tank being filled which would prevent the valve from functioning in its proper manner.

Thus it can be seen that a valve has been provided for a fuel storage tank which permits the vent pipe to function in its intended manner while still preventing a serious overflow of fuel through the vent pipe. The valve of this invention is economical of manufacture and requires little if any maintenance. Thus it can be seen that the device accomplishes at least all of its stated objectives.

I claim:
1. In combination:
a fuel storage tank having an upper end,
a fill pipe means extending from said tank at the upper end thereof,
a vent pipe means extending from said tank at the upper end thereof,
a hollow member operatively secured to the upper end of said tank and extending downwardly thereinto, said hollow member being in communication with said vent pipe means, and
a float valve means operatively pivotally secured to the lower end of said hollow member and being pivotally movable from an open position with respect to said hollow member to a closed position on said hollow member lower end whereby said valve means seals the lower end thereof,
said valve means being moved from its open position to its closed position when the fuel in said tank reaches a predetermined level,
said hollow member having a port formed therein intermediate its length below the upper end of said tank, said port means having a diameter substantially less than the diameter of the lower end of said hollow member, said port permitting the fluid communication between the interior of said tank with the interior of said vent pipe when said valve means is in a closed position, and
a rod means secured to said hollow member and extending downwardly and outwardly therefrom and being in the pivotal path of said valve means to limit the opening of said valve means.
2. The combination of claim 1 wherein said hollow member is cylindrical and wherein said valve means includes a disk having a float means secured thereto and extending downwardly therefrom.
3. The combination of claim 2 wherein said disk has a peripheral seat portion adapted to seat upon the lower end of said hollow member.
4. In combination:
a fuel storage tank having an upper end,
a fill pipe means extending from said tank at the upper end thereof,
a hollow member operatively secured to the upper end of said tank and extending downwardly thereinto, said hollow member being in communication with said vent pipe means, and
a float valve means operatively pivotally secured to the lower end of said hollow member and being pivotally movable from an open position with respect to said hollow member to a closed position on said hollow member lower end whereby said valve means seals the lower end thereof,
said valve means being moved from its open position to its closed position when the fuel in said tank reaches a predetermined level,
said hollow member having a port formed therein intermediate its length below the upper end of said tank, said port means having a diameter substantially less than the diameter of the lower end of said hollow member, said port permitting the fluid communication between the interior of said tank with the interior of said vent pipe when said valve means is in a closed position, and
a limit means on said hollow member limiting the pivotal movement of said valve means to limit the opening of said valve means.
5. The combination of claim 4 wherein said hollow member is cylindrical and wherein said valve means includes a disk having a float means secured thereto and extending downwardly therefrom.
6. The combination of claim 4 wherein said fill pipe is adapted to have a fill line coupling means secured thereto to facilitate the filling of said tank and wherein said port means is the only means of fluid communication between the atmosphere and the interior of said tank when said valve means is closed and said fill pipe has said coupling means secured thereto.

References Cited
UNITED STATES PATENTS

| | | | |
|---|---|---|---|
| Re. 21,930 | 10/1941 | Scully et al. | |
| 1,591,079 | 7/1926 | Burnham et al. | |
| 2,784,561 | 3/1957 | Postlewait | 220—86 X |
| 3,306,314 | 2/1967 | Judsen | 137—202 |

RAPHAEL H. SCHWARTZ, Primary Examiner

U.S. Cl. X.R.
137—202